(No Model.) 2 Sheets—Sheet 1.

J. FRAZEE.
FODDER BINDER.

No. 388,033. Patented Aug. 21, 1888.

Witnesses.
Edwin J. Eby.
Thos. P. Eby.

Inventor.
Jeremiah Frazee.

(No Model.) 2 Sheets—Sheet 2.
J. FRAZEE.
FODDER BINDER.
No. 388,033. Patented Aug. 21, 1888.
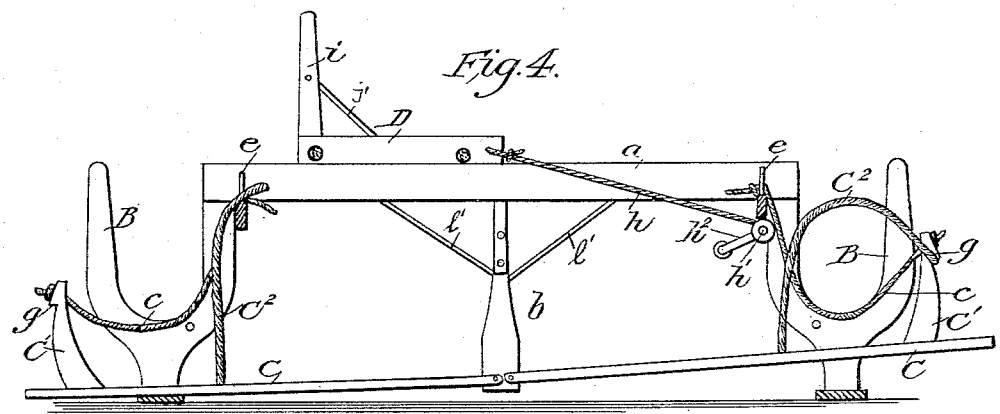
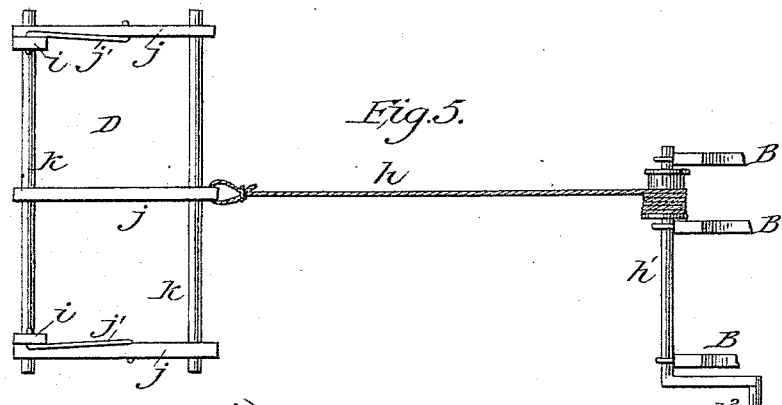
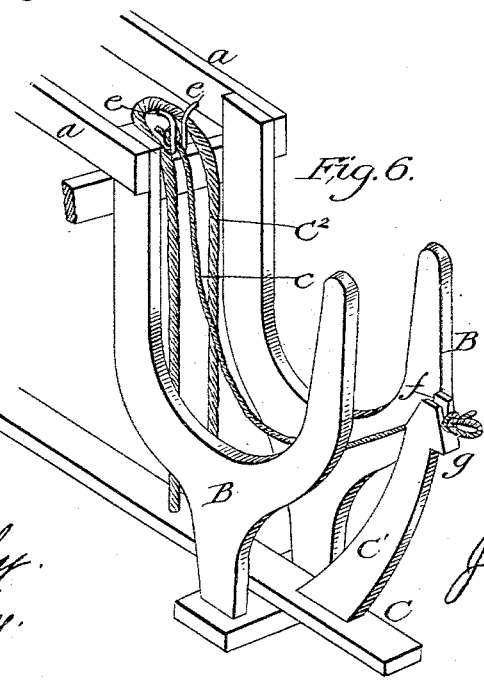
Witnesses.
Edwin J. Eby.
Thos. P. Eby.
Inventor.
Jeremiah Frazee.

UNITED STATES PATENT OFFICE.

JEREMIAH FRAZEE, OF CASSTOWN, OHIO.

FODDER-BINDER.

SPECIFICATION forming part of Letters Patent No. 388,033, dated August 21, 1888.

Application filed February 13, 1888. Serial No. 263,912. (No model.)

*To all whom it may concern:*

Be it known that I, JEREMIAH FRAZEE, a citizen of the United States, residing at Casstown, in the county of Miami and State of Ohio, have invented certain new and useful Improvements in Fodder-Binding Machines, of which the following is a specification.

The object of my invention is to lighten the labor connected with corn-husking and fodder-binding; also, to secure tight binding and uniformity in size of sheaves, as well as cleanliness of fodder. I attain these objects by a proper use of the mechanism illustrated in the accompanying drawings, in which—

Figure 1:
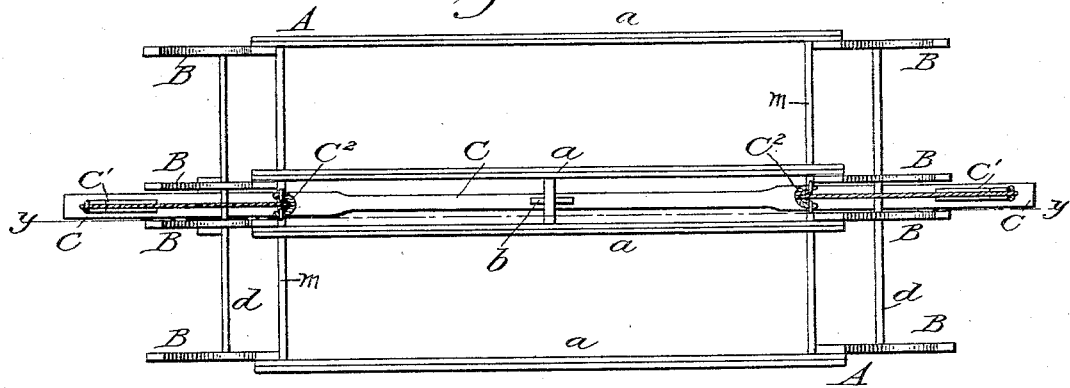
Figure 2:
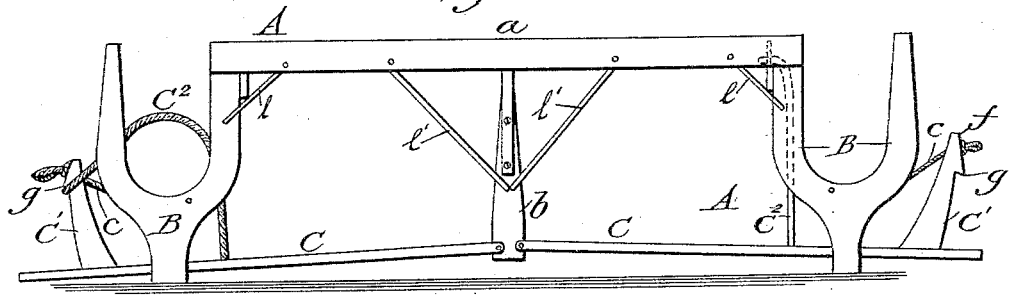
Figure 3:
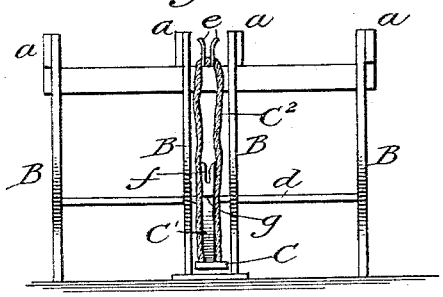

Figure 1 is a top view; Fig. 2, is side view showing at the right-hand end the treadle down, the compressing-rope and band-cord adjusted for receiving fodder. The position of the rope and treadle when fodder is fully pressed is shown at the left-hand end of same figure. Fig. 3 is an end view showing the compressing-rope and the open-ended slot in the upright for holding one end of the band-cord, also a crotch made by securing two pins in the frame for holding the other end of the band-cord. Fig. 4 is a side view showing a windlass, a carriage, and a connecting-cord. The position that the band-cord, compressing-rope, and treadle would occupy when fodder is ready for pressure is shown at the right-hand end of the same figure. Fig. 5 is a view of the carriage, the connecting-cord, and windlass. Fig. 6 is a perspective view of the compressing mechanism as shown when in readiness for receiving fodder.

Similar letters refer to similar parts throughout the several views.

The yokes B, the bars $a$, the rod $d$, and the dependent bar $b$, properly fastened together, constitute the frame-work.

The horizontal bars $a$ are arranged parallel with each other, so as to present the figure of a rectangle within a rectangle, said bars being of equal length and the two inner bars being placed near the middle of the frame. Each end of each one of these bars is attached by means of bolts or otherwise to the upper end of the inner branch of each one of the yokes B. These yokes are made in the shape of the letter U, with a third branch descending to the ground for the support of the frame, the yokes standing in line with the bars for the reception of the fodder. To give rigidity to the frame, the inner branches of the yokes B are connected by braces $l$ to the horizontal bars $a$. The parts of the frame thus constructed are secured together into a whole by the horizontal cross-bars $m$ and rods $d$ or their equivalents. I prefer securing said cross-bars to the inner branches of yokes. Two of said bars may be secured to the yokes B for additional strength. The upper end of the descending bar $b$ is attached to the two inner bars, $a$, and is further secured thereto by braces $l'$, attached to said bar and to each one of said inner bars, $a$.

C represents the treadle-bars pivoted at their inner ends to the bar $b$.

C' represents upright posts attached to the outer ends of the treadle-bars.

$C^2$ represents ropes attached at one end to the treadle-bars.

$f$ is an open crotch in the free end of the upright posts C', for holding one end of the band-cords $c$.

$e$ denotes two parallel upright pins arranged in the frame to form a crotch for holding the inner end of the band-cords.

$g$ is a notch, (shown in Figs. 2, 3, 4, and 6.) This notch is made on the outer side of the upright posts C', and is to receive and hold the outer end of the compressing-ropes $C^2$.

D is a carrying-frame. $h^2$ is a crank; $h'$, a crank-shaft; $h$, a connecting-cord. The carrying-frame D consists of two upright standards, $i$, three horizontal bars, $j$, two braces, $j'$, and two rounds or cross-pieces, $k$. The standards and bars are each about eighteen inches in length, being about one inch thick and two broad, the standards being tapered to about one inch in breadth at their upper end. About three-quarter-inch holes are made through the standard-pieces near the broad ends. Holes also of same size are to be made through the bars near the ends. The rounds are to be of same size of said holes that they may be fitted in them, placing one bar at the middle of rounds, the two other bars sufficiently near the ends of the rounds to fit just inside the two outside bars, $a$. The rounds are to be long enough to rest on all of the bars $a$ when the carrying-frame is placed upon the binder-frame. The standards, having the ends of one round passed through them, are to be placed just inside of the outside bars of carrying-frame and stayed in an upright position by the braces $j'$. A cord having one end made fast to the end of the middle bar of the carrying-frame has the other end secured to a spool on the crank-shaft $h'$, said spool being about two inches in diameter. When the shaft (which is secured to the yokes B about six inches below the under sides of the bars $a$) is turned, the carrying-frame simply slides, the rounds resting upon the bars $a$.

To operate this binder, the fodder with corn in is placed crosswise upon the frame, the rope, band-cord, and treadle occupying the position shown in Fig. 6. The position of the operator generally is to be near the binding mechanism shown in Fig. 6. Before any fodder has been dropped into the yokes B he may stand between an interior and an outside yoke, the width of the frame being about three feet. As the corn is husked the fodder is dropped into the yokes B. When the space in them is filled, the operator takes hold of the rope $C^2$, and by lifting it and drawing it forward he is enabled to place it in the notch $g$ preparatory to pressing the fodder. The pressing is done by bearing down upon the treadle with the foot, leaving the hands free to adjust the band-cord $c$, which passes between the branches of the rope $C^2$. The tying or looping of the band-cord is done after bringing the ends together on the top side of the fodder. After adjusting the band-cord the treadle is lifted, and the rope released from the notch and placed in the position shown in Figs. 3 and 6. The sheaf is then easily lifted out, the distance between the branches of each yoke being about thirteen inches at the top and at the bottom about twelve inches, the depth of the space referred to being about eighteen inches.

It will be seen by reference to Figs. 2 and 4 that this binder is so constructed as to be conveniently used by either one or two persons at the same time, the length of the horizontal bars $a$ being about six feet.

The carrying-frame, windlass, and connecting-cord may be used to move the fodder toward the operator when only one person wishes to use the binder. The connecting-cord is to be loosened from the carriage and the carriage lifted off when two persons wish to use the binder.

Having thus described my invention, what I claim, and desire to secure by Letters Patent of the United States, is—

1. In a fodder-compressor, the combination of the bars $a$, the inverted yokes B, secured to the bars $a$ at their ends to support the said bars, the yokes forming a holder for the fodder, the vertical bar $b$ dependent from the frame, the treadle-bars C, pivoted at their inner ends to the bar $b$, having the upright posts $C'$, rigidly secured to them at their outer ends, and the compressor-ropes $C^2$, one end made fast to the treadle-bars, the other end adapted to be passed over the fodder in the yokes and removably attached to the upright posts $C'$, substantially as herein set forth.

2. In a fodder-compressor, the combination of the horizontal bars $a$, the inverted yokes B, secured to the bars $a$ at their ends to support the said bars, the vertical dependent bar $b$, dependent from the frame, the treadle-bars C, and the compressor-ropes $C^2$, one end made fast to the treadle-bars and the other end adapted to be passed over the fodder in the yokes and removably attached to the upright posts $C'$, the upright posts $C'$, having open slots in the free ends for holding the outer ends of the band-cords $c$, also having the notch $g$ on the outer side near the top end, to which the free ends of the compressor-ropes $C^2$ are removably attached, substantially as herein set forth.

3. In a fodder-compressor, the combination of the bars $a$, the inverted yokes B, secured to the bars $a$ at their ends to support the said bars, the yokes forming a holder for the fodder, the vertical bar $b$, dependent from the frame, the treadle-bars C, pivoted at their inner ends to the bar $b$, having the upright posts $C'$ rigidly secured to them at their outer ends, the compressor-ropes $C^2$, one end made fast to the treadle-bars, and the other adapted to be passed over the fodder in the yokes, and removably attached to the upright posts $C'$, the carrying-frame D, comprising standards $i$, horizontal bars $j$, braces $j'$, and cross-pieces $k$, the said cross-pieces resting on the horizontal bars $a$ of the binder-frame, a windlass secured to the yokes, and a cord connecting the windlass and the carrying-frame, substantially as herein set forth.

JEREMIAH FRAZEE.

Witnesses:
F. G. MAIN,
J. A. DAVY.